(12) United States Patent
Lao et al.

(10) Patent No.: US 8,971,577 B2
(45) Date of Patent: Mar. 3, 2015

(54) MONITORING DEVICE, RELIABILITY CALCULATION PROGRAM, AND RELIABILITY CALCULATION METHOD

(71) Applicant: OMRON Corporation, Kyoto (JP)

(72) Inventors: Shihong Lao, Kyoto (JP); Tsuyoshi Kurata, Kyoto (JP)

(73) Assignee: OMRON Corporation, Kyoto (JP)

( * ) Notice: Subject to any disclaimer, the term of this patent is extended or adjusted under 35 U.S.C. 154(b) by 130 days.

(21) Appl. No.: 13/777,519

(22) Filed: Feb. 26, 2013

(65) Prior Publication Data

US 2013/0243246 A1 Sep. 19, 2013

(30) Foreign Application Priority Data

Mar. 15, 2012 (JP) ................................. 2012-058459

(51) Int. Cl.
*G06K 9/00* (2006.01)

(52) U.S. Cl.
CPC ........ *G06K 9/00255* (2013.01); *G06K 9/00221* (2013.01); *G06K 9/00771* (2013.01)
USPC ....................................................... 382/103

(58) Field of Classification Search
None
See application file for complete search history.

(56) References Cited

U.S. PATENT DOCUMENTS

| 7,440,594 | B2 | 10/2008 | Takenaka |
|---|---|---|---|
| 2004/0081338 | A1 | 4/2004 | Takenaka |
| 2005/0057653 | A1 | 3/2005 | Maruya |
| 2009/0185784 | A1* | 7/2009 | Hiroike et al. ................... 386/69 |
| 2009/0324020 | A1* | 12/2009 | Hasebe et al. ................. 382/115 |

FOREIGN PATENT DOCUMENTS

| EP | 1998567 A1 | 12/2008 |
|---|---|---|
| JP | 2004062560 A | 2/2004 |

OTHER PUBLICATIONS

Patent Abstract for Japanese Publication No. 2004-062560 published Feb. 26, 2004 (1 page).
Extended European Search Report in counterpart European Patent Application No. 13156462.7, mailed Oct. 27, 2014 (7 pages).
Demirkus et al.; "Automated person categorization for video surveillance using soft biometrics"; Proceedings of SPIE, vol. 7699, p. 76670P; Apr. 5, 2010 (12 pages).
De Zhang et al.; "Gender Recognition Based on Fusion of Face and Multi-view Gait"; Advances in Biometrics, pp. 1010-1018; Jun. 2, 2009 (9 pages).

* cited by examiner

*Primary Examiner* — Shervin Nakhjavan
(74) *Attorney, Agent, or Firm* — Osha Liang LLP

(57) ABSTRACT

A monitoring device has a detection target person storage part in which a feature of a face of each detection target person is stored, an image processor that processes images captured with a plurality of imaging devices having different imaging areas, and detects the image in which the detection target person stored in the detection target person storage part is captured, a detection information storage part in which detection information is stored, the detection information including the detection target person, imaging area, and imaging date and time with respect to the image in which the detection target person detected by the image processor is captured, and a reliability calculator that calculates a degree of detection reliability in the image processor based on a time-space rationality, the time-space rationality being determined from a plurality of pieces of detection information on each detection target person.

10 Claims, 4 Drawing Sheets

MONITORING DEVICE, RELIABILITY CALCULATION PROGRAM, AND RELIABILITY CALCULATION METHOD

BACKGROUND OF THE INVENTION

1. Technical Field

The present invention relates to a monitoring device, a reliability calculation program, and a reliability calculation method, which process images captured with a plurality of imaging devices having different imaging areas, detect the image in which a detection target person is captured, and output a detection notification about the detection target person of the detected image.

2. Related Art

Nowadays, monitoring cameras are placed at various sites, such as an airport, a station, a shopping center, and a street corner. An image, in which a detection target person who is a person on a wanted list is captured, is detected by performing face recognition in which a face of a person in the image captured with the monitoring camera is matched against a face of the detection target person (for example, see Japanese Unexamined Patent Publication No. 2004-62560).

In this kind of monitoring device, the monitoring device notifies a related organization of a detection notification including a site where the image is captured, date and time, and the imaged detection target person when the image in which the detection target person is captured is detected.

In the related organization, an agent searches the detection target person based on the detection notification.

However, in the face recognition, a degree of similarity between a feature quantity of the face of the person in whom the image is captured with the monitoring camera and a feature quantity of the face of the detection target person is calculated, and the person in whom the image is captured with the monitoring camera is determined to be the detection target person when the calculated degree of similarity exceeds a predetermined criterion.

In the face recognition, it is necessary that the criterion for the degree of similarity be extremely increased in order to reduce a probability of mistakenly recognizing another person in whom the image is captured with the monitoring camera as the detection target person (false match rate) to zero. At the same time, the probability of mistakenly recognizing the detection target person in whom the image is captured with the monitoring camera as another person (false rejection rate) increases with increasing criterion for the degree of similarity. Accordingly, in the face recognition, it is necessary that the probability of mistakenly recognizing the detection target person in whom the image is captured with the monitoring camera as another person (false rejection rate) be brought close to one in order to reduce a probability of mistakenly recognizing another person in whom the image is captured with the monitoring camera as the detection target person (false match rate) to zero, and it is difficult to balance the probabilities in terms of usefulness.

Therefore, the number of detection notifications due to the false detection of the detection target person (a notification provided by mistakenly recognizing another person as the detection target person) increases with increasing number of monitoring cameras used to detect the detection target person. For example, even if the probability of mistakenly recognizing another person in whom the image is captured with the monitoring camera as the detection target person is 0.1%, the detection notification is provided once per 10 minutes due to the false recognition of another person as the detection target person in the monitoring camera that captures images of 100 walking persons per minute. In the case that 100000 monitoring cameras are used (similarly, in the case that one monitoring camera captures images of 100 walking persons per minute), the detection notification is provided 10000 times per minute due to the false recognition of another person as the detection target person. That is, in the related organization, although the agent should search the detection target person with respect to the detection notifications, which are provided 10000 times per minute due to the false recognition of another person as the detection target person (substantially useless searches), it is difficult to secure human resources, and unfortunately it is ideal. Due to a shortage of the human resources, sometimes the detection target person is not searched with respect to the detection notification that is provided by correctly recognizing the detection target person as the detection target person.

The number of detection notifications due to the false recognition of another person as the detection target person can be decreased by decreasing the number of monitoring cameras used to detect the detection target person. However, a potential to capture the image of the detection target person (namely, a potential to be able to detect the detection target person) is decreased.

SUMMARY

One or more embodiments of the present invention provides a monitoring device, reliability calculation program, and reliability calculation method, which sufficiently suppress human resources necessary to search the detection target person with respect to the detection notification, which is provided by mistakenly recognizing another person as the detection target person, even if the potential to detect the detection target person is improved using more imaging devices.

In accordance with one or more embodiments of the present invention, a monitoring device is configured as follows.

A feature of a face of each detection target person is stored in a detection target person storage part. For example, the detection target person is a person on the wanted list. The feature of the face of the detection target person stored in the detection target person storage part may be a face image of the detection target person or a feature quantity (feature quantities of face components, such as a contour of a face, eyes, a nose, and a mouth) of a face extracted from the face image.

An image processor processes images captured with a plurality of imaging devices having different imaging areas, and detects the image in which the detection target person stored in the detection target person storage part is captured. The image processor extracts the feature of the face of the detection target person in the captured image, and detects the image in which the detection target person is captured through face recognition in which the extracted feature of the face is matched against the feature of the face of the detection target person stored in the detection target person storage part.

When the image processor detects the image in which the detection target person is captured, detection information including the detection target person, imaging area, and imaging date and time, which are captured in the image, is produced and stored in a detection information storage part. The detection information stored in the detection information storage part includes not only detection information in which the detection target person is correctly recognized but also detection information in which another person is mistakenly recognized as the detection target person.

A reliability calculator calculates a degree of detection reliability in the image processor based on a time-space rationality, the time-space rationality being determined from a plurality of pieces of detection information on each detection target person, the pieces of detection information being stored in the detection information storage part. For example, the plurality of pieces of detection information on the detection target person are arranged in time series, and a movement route of the detection target person is estimated by a position of the detection target person indicated by each piece of detection information. The degree of detection reliability in the image processor is calculated based on the time-space rationality of the estimated movement route. As used herein, for example, the time-space rationality means that the detection target person is detected at the temporally movable position or that the detection target person is detected at the position that is not temporally movable. The time-space rationality is determined to be absent in the case that the identical detection target person is detected at a plurality of sites (for example, Osaka, Kyoto, and Nagoya) relatively distant from one another on substantially identical date and time. In the case that the time-space rationality is absent, it is considered that the detection information on the detection target person includes the detection information in which another person is mistakenly recognized as the detection target person.

An output part outputs a detection notification about the detection target person based on the degree of detection reliability in the image processor, the degree of detection reliability being calculated by the reliability calculator. In this case, the output part may be configured not to output the detection notification, as a detection result of the face recognition, about the detection target person in whom the calculated degree of reliability is less than a predetermined level.

Accordingly, a related organization notified of a detection notification related to the detection of the detection target person can search the detection target person in the descending order of the degree of reliability in the detection notification. Therefore, the human resources necessary to search the detection target person with respect to the detection notification, which is provided by mistakenly recognizing another person as the detection target person, are sufficiently suppressed even if the potential to detect the detection target person is improved using more imaging devices.

A reliability ranking in which the detection target persons are ranked may be generated using the degree of detection reliability calculated by the reliability calculator, and the detection notification about each detection target person may be output in a ranking format based on the generated reliability ranking.

The reliability calculator may calculate the degree of detection reliability in the image processor with respect to each detection target person such that the degree of detection reliability in the image processor increases with increasing number of times in which the identical movement route is estimated with respect to the detection target person.

According to one or more embodiments of the present invention, the human resources necessary to search the detection target person with respect to the detection notification, which is provided by mistakenly recognizing another person as the detection target person, are sufficiently suppressed even if the potential to detect the detection target person is improved using more imaging devices.

DETAILED DESCRIPTION

Hereinafter, a monitoring device according to embodiments of the present invention will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
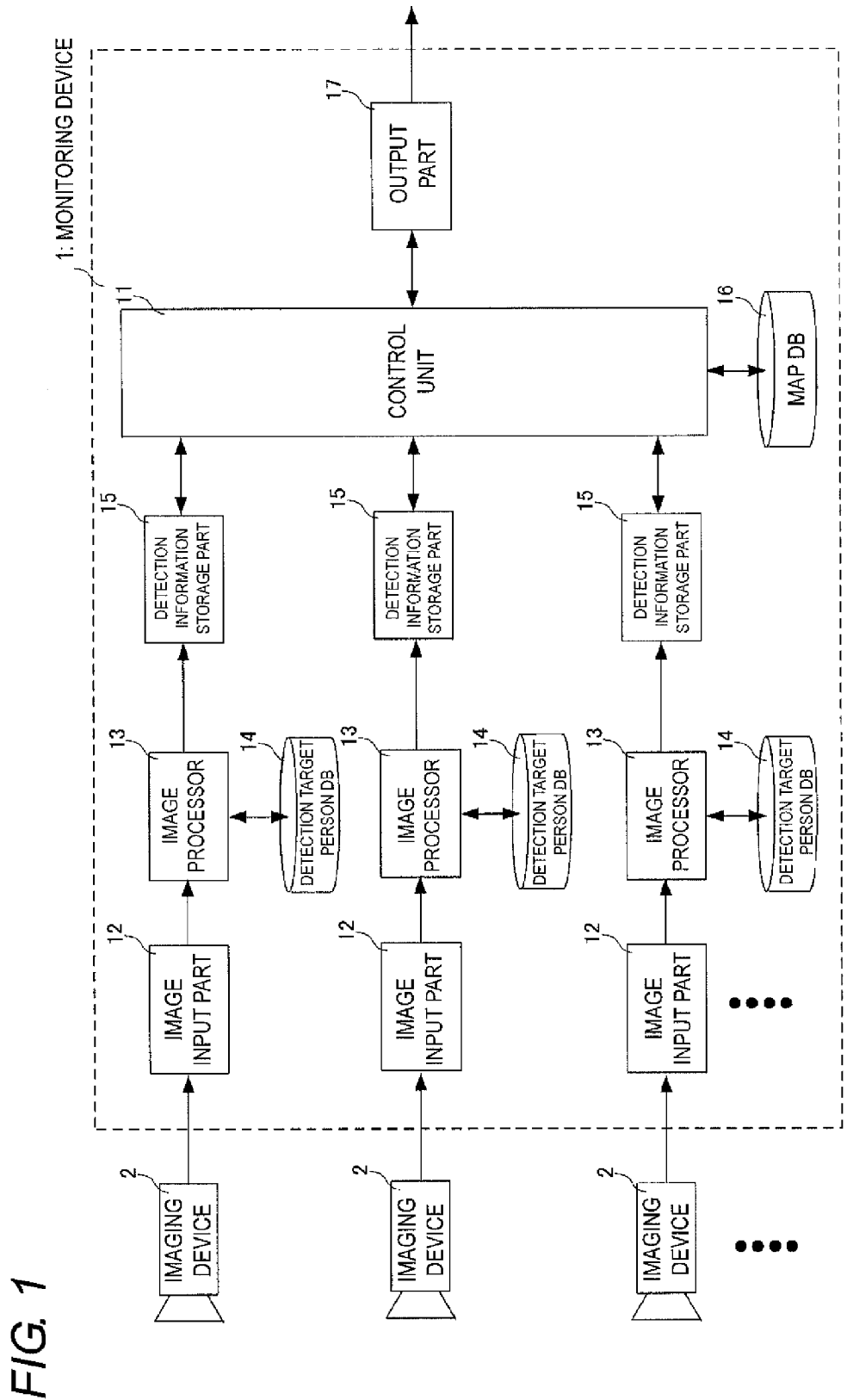
FIG. 1 is a block diagram illustrating a configuration of a main portion of a monitoring device.

FIG. 1 is a block diagram illustrating a configuration of a main portion of the monitoring device according to one or more embodiments of the present invention.

A plurality of imaging devices 2 having different imaging areas are connected to a monitoring device 1. The imaging devices 2 are monitoring cameras placed in various sites, such as an airport, a station, a shopping center, and a street corner. The imaging device 2 is what is called a video camera, and outputs images captured in the imaging area at about 10 to about 30 frames per second.

As illustrated in FIG. 1, the monitoring device 1 includes a control unit 11, an image input part 12, an image processor 13, a detection target person database 14 (detection target person DB 14), a detection information storage part 15, a map database 16 (map DB 16), and an output part 17.

The control unit 11 controls an operation of each part of a main body of the monitoring device 1, and performs movement route estimation processing, reliability calculation processing, and reliability ranking generation processing which will be described later.

A monitoring device 1 according to one or more embodiments of the present invention includes the image input part 12, the image processor 13, and the detection target person DB 14 in each imaging device 2.

The image captured with the imaging device 2 connected to the image input part 12 is input to the image input part 12. The image input part 12 includes storage mediums (not illustrated), such as a hard disk, in which the captured image input from the imaging device 2 connected to itself is stored.

The image processor 13 is provided in each image input part 12. The image processor 13 performs image processing (face recognition processing) to the image, which is captured with the imaging device 2 and input to the image input part 12 connected to the imaging device 2. The detailed face recognition processing is described later.

A feature of a face of a detection target person is stored in the detection target person DB 14. For example, the detection target person is a person on a wanted list. The detection target person DB 14 may be a database in which a face image of the detection target person is stored or a database in which a feature quantity (feature quantities of face components, such as a contour of a face, eyes, a nose, and a mouth) of a face extracted from the face image of the detection target person is stored.

In one or more of the above embodiments, the image input part 12 is configured to be included with respect to each imaging device 2 by way of example. Alternatively, the plurality of imaging devices 2 are divided into groups at each installation site and each group may include the image input part 12. In this case, one or more imaging devices 2 belonging to corresponding group are connected to each image input part 12. One or more imaging devices 2 input the captured images to the image input part 12 connected to itself/themselves.

In one or more of the above embodiments, the detection target person DB 14 is configured to be included with respect to each image processor 13. Alternatively, one detection target person DB 14 may be shared by the image processors 13. The plurality of detection target person DBs 14 in FIG. 1 are managed such that storage contents of the detection target person DBs 14 become identical to one another.

The image input part 12, the image processor 13, and the detection target person DB 14, which are included with respect to each imaging device 2, are used as an image processing unit, the image processing unit is provided not in the main body of the monitoring device 1 but around the site where each imaging device 2 is placed, and each image processing unit may communicably be connected to the main body of the monitoring device 1 through a dedicated line or the Internet.

The detection information storage part 15 is provided in each image processor 13. The image processor 13 connected to the detection information storage part 15 notifies the detection information storage part 15 of pieces of detection information, and the pieces of detection information are stored in the detection information storage part 15 in an accumulated manner. The detection information includes a detection target person code identifying the detection target person, an imaging device code identifying the imaging device 2, and date and time data indicating imaging date and time. The detection information storage part 15 may be not provided in each image processor 13, but collectively shared by the image processors 13.

Data correlating the imaging device code with a position of the imaging area of the imaging device 2 identified by the imaging device code is stored in the control unit 11. Accordingly, the control unit 11 can obtain the detected detection target person, a detection place, and detection date and time by the detection information stored in the detection information storage part 15.

Map data is stored in the map DB 16. The monitoring device 1 may include a database related to a train timetable in a railroad network or an airplane timetable, or acquire the database related to the train timetable or the airplane timetable from an open website through the Internet.

Based on the detection information stored in the detection information storage part 15, the control unit 11 performs movement route estimation processing of estimating a movement route of each detection target person using the map data stored in the map DB 16. Based on a time-space rationality, the control unit 11 performs reliability calculation processing of calculating a degree of detection reliability of the detection target person with respect to the estimated movement route. Using the degree of reliability calculated in each detection target person, the control unit 11 performs reliability ranking generation processing of generating a reliability ranking in which the detection target persons are ranked.

The output part 17 notifies a terminal (not illustrated) of a related organization connected through a network of a detection result.

An operation of the monitoring device 1 according to one or more embodiments of the present invention will be described below.

Each imaging device 2 inputs the image in which the imaging area is captured to the image input part 12. The image input part 12 stores the image that is captured with and input from the imaging device 2 connected to itself in storage mediums, such as a hard disk in an accumulated manner. A time stamp indicating the imaging date and time is correlated with the captured image stored in the storage medium.

Figure 2:
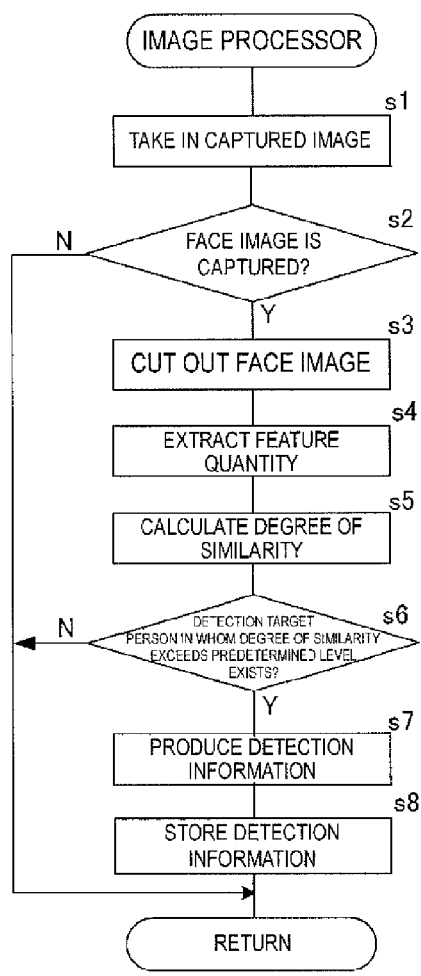
FIG. 2 is a flowchart illustrating face recognition processing in an image processor.

Processing of detecting the detection target person in each image processor 13 will be described. The image processor 13 detects the detection target person through the face recognition processing. FIG. 2 is a flowchart illustrating the face recognition processing in the image processor 13.

The image processor 13 fetches the oldest captured image (one frame), to which the face recognition processing is not performed, from the image input part 12 (s1). The image processor 13 determines whether a face image of a person is captured in the captured image fetched in s1 (s2). The processing in s2 is performed by well-known pattern matching. The image processor 13 return to s1 when the face image of the person is not captured in the captured image fetched in s1.

The image processor 13 cuts out the captured face image of the person when the face image of the person is captured in the captured image fetched in s1 (s3). In s3, the captured face image is cut out in each face. The image processor 13 extracts a feature quantity of the face in each face image cut out in s3 (s4). The feature quantities of face components, such as the contour of the face, the eyes, the nose, and the mouth, are extracted in s4.

The image processor 13 calculates a degree of similarity between the feature quantity of each face in which the feature quantity is extracted in s4 and the feature quantity of the face of each detection target person stored in the detection target person DB 14 (s5). The image processor 13 determines existence or non-existence of the detection target person in whom the degree of similarity calculated in s5 exceeds a predetermined recognition level (s6). The image processor 13 returns to s1 when the detection target person in whom the degree of similarity calculated in s5 exceeds the predetermined recognition level does not exist.

When the detection target person in whom the degree of similarity calculated in s5 exceeds the predetermined recognition level exists in the faces in each of which the feature quantity is extracted in s4, the image processor 13 determines that the image of the detection target person having the maximum degree of similarity is captured, and produces the detection information (s7). The detection information produced in s7 includes the detection target person code identifying the detected detection target person, the imaging device code identifying the imaging device 2, and the date and time data indicating the imaging date and time. The detection information may include information specifying the detected detection target person, the detected site, and the detected date and time. For example, the imaging device code identifying the imaging device 2 may be replaced with positional information (a latitude and a longitude) indicating the position of the imaging area of the imaging device 2. When the plurality of faces of the detection target persons in each of whom the degree of similarity exceeds the predetermined recognition level are cut out in s3, the image processor 13 produces the detection information on each face in s7.

The image processor 13 stores the detection information produced in s7 in the detection information storage part 15 (s8). Then the image processor 13 returns to s1.

In one or more of the above embodiments, the detection information storage part 15 is included with respect to each image processor 13, the image processor 13 is included with respect to each image input part 12, and the image input part 12 is connected to each imaging device 2. Accordingly, the detection information having the same imaging device code is stored in each detection information storage part 15. Therefore, the detection information stored in the detection information storage part 15 may not include the imaging device code. In this case, the imaging device code (or the positional information indicating the position of the imaging area) may be stored in the control unit 11 while correlated with each detection information storage part 15.

The movement route estimation processing performed by the control unit 11 will be described below. In the movement route estimation processing, based on the detection information stored in the detection information storage part 15, the control unit 11 estimates the movement route of each detection target person using the map data stored in the map DB 16. The movement route estimation processing is repeatedly performed at predetermined timing, for example, every hour (every hour on the hour) or at midnight every day.

Figure 3:
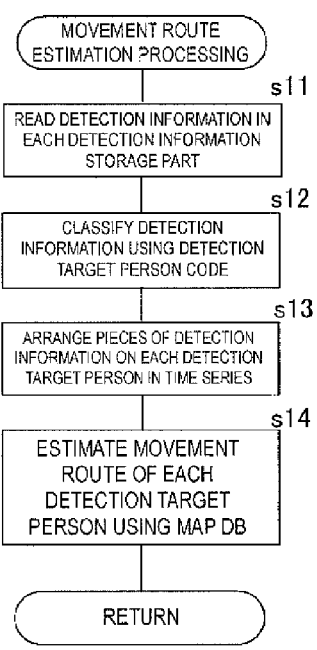
FIG. 3 is a flowchart illustrating movement route estimation processing.

FIG. 3 is a flowchart illustrating the movement route estimation processing. The control unit 11 reads all the pieces of detection information stored in each detection information storage part 15 (s11).

The control unit 11 classifies the pieces of detection information read in s11 using the detection target person code identifying the detection target person (s12). Therefore, the pieces of detection information on each detection target person are grouped.

Figure 4A:
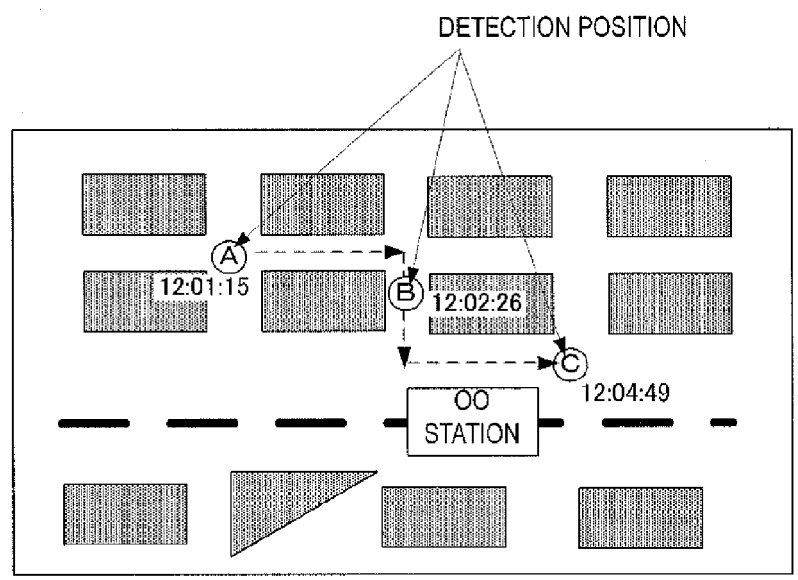
FIGS. 4A and 4B are views each illustrating an estimated movement route.
Figure 4B:
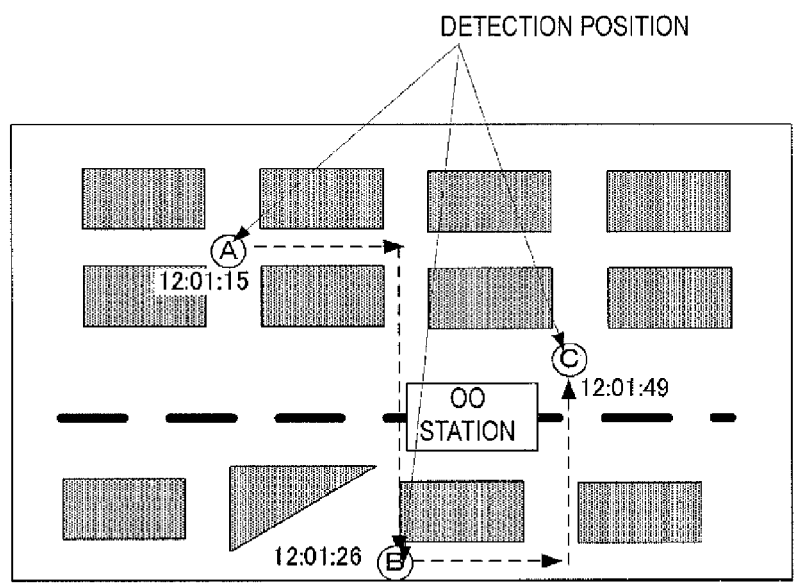

The control unit 11 arranges the pieces of detection information on each detection target person in time series (s13). Based on the pieces of detection information on each detection target person arranged in time series in s13, the control unit 11 estimates the movement route of each detection target person using the map data stored in the map DB 16 (s14). The control unit 11 estimates the movement route of each detection target person by connecting the detection position (the position of the imaging area of the imaging device 2) indicated by the detection information on the detection target person on the map in time series. For example, the movement routes in FIGS. 4A and 4B are estimated. In FIGS. 4A and 4B, points A, B, and C are the detection positions of the detection target person. A clock time indicated near each detection position is the detection date and time. The month and year are omitted in FIGS. 4A and 4B.

The control unit 11 does not estimate the movement route with respect to the detection target person having only one piece of detection information.

Figure 5:
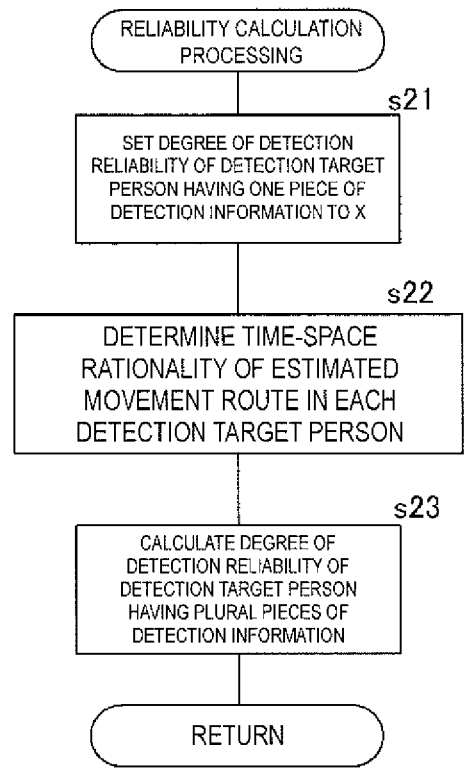
FIG. 5 is a flowchart illustrating reliability calculation processing.

The reliability calculation processing performed by the control unit 11 will be described below. In the reliability calculation processing, based on the time-space rationality, the degree of detection reliability of the detection target person is calculated with respect to the movement route estimated through the movement route estimation processing. FIG. 5 is a flowchart illustrating the reliability calculation processing.

As described above, the control unit 11 does not estimate the movement route with respect to the detection target person having only one piece of detection information. Therefore, the control unit 11 sets the degree of detection reliability to a predetermined value X (X>0) (s21).

The control unit 11 determines the time-space rationality with respect to the movement route estimated through the movement route estimation processing (s22). Whether the movement between the detection positions adjacent to each other can temporally be performed in the estimated movement route is determined in s22. Specifically, transportation means (such as walk, a bicycle, a railroad, and an automobile) between the detection positions is estimated. For example, the transportation means is fixed according to a distance between the detection positions adjacent to each other (for example, the railroad (or the automobile) for the distance of 5 km or more, the bicycle for the distance ranging from 2 to 5 km, and the walk for the distance of 2 km or less), and the transportation means is estimated (selected) based on the distance between the detection positions.

The control unit 11 determines whether the movement between the detection positions adjacent to each other can temporally be performed by the estimated (selected) transportation means. The control unit 11 determines whether the movement can be performed using a movement speed previously set in each transportation means. In the case that the transportation means is the railroad, whether the movement can be performed may be determined using the timetable, for example. The control unit 11 determines that the time-space rationality exists when the movement can be performed, and the control unit 11 determines that the time-space rationality does not exist when the movement cannot be performed.

For the detection target person detected at n points, the control unit 11 determines the time-space rationality between the detection positions adjacent to each other (n−1) times in s22. Assuming that a point Y (Y>0) is the degree of reliability between the detection positions, which are adjacent to each other and are determined to have the time-space rationality, and that a point Z (Z<0) is the degree of reliability between the detection positions, which are adjacent to each other and are determined to have no time-space rationality, the control unit 11 calculates the degree of detection reliability with respect to the detection target person having the plurality of pieces of detection information (s23).

Specifically, $$\text{degree of detection reliability} = \alpha \times Y + \beta \times Z$$

where $\alpha + \beta = n - 1$, $\alpha$ is the number of pieces between the detection positions, which are adjacent to each other and are determined to have the time-space rationality, and $\beta$ is the number of pieces between the detection positions, which are adjacent to each other and are determined to have no time-space rationality.

According to one or more embodiments of the present invention, Y is set to a value greater than X.

The degree of detection reliability increases with increasing number of pieces of detection information having the time-space rationality. On the other hand, the degree of detection reliability decreases with increasing number of pieces of detection information having no time-space rationality. In the case that the detection positions are determined to have no time-space rationality, another person is mistakenly recognized as the detection target person in at least one of the pieces of detection information on the detection positions adjacent to each other. Accordingly, the calculated degree of detection reliability decreases when the false recognition occurs frequently.

The technique of calculating the degree of detection reliability is not limited to the above technique, but the degree of detection reliability may be calculated by another technique.

The control unit 11 stores the movement route, which is estimated from the detection information on the detection target person, and the degree of detection reliability in the storage medium (not illustrated) in the accumulated manner with respect to each detection target person.

Figure 6:
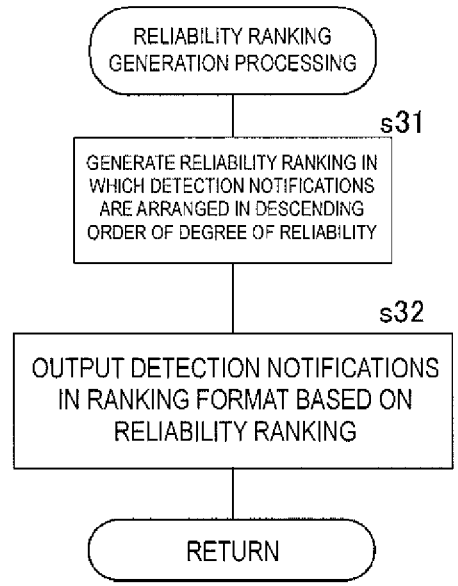
FIG. 6 is a flowchart illustrating reliability ranking generation processing.

FIG. 6 is a flowchart illustrating the reliability ranking generation processing in the control unit.

The control unit 11 generates a reliability ranking in which the degrees of detection reliability calculated through the reliability calculation processing are arranged in the descending order (s31). The control unit 11 causes the output part 17 to output detection notifications in a ranking format based on the reliability ranking generated in s31 to the terminal of the related organization (s32). In the detection notification output in s32, the detection target persons are arranged in the descending order of the degree of detection reliability. The detection notification includes the detection information on the corresponding detection target person and the movement route estimated through the movement route estimation processing.

In the terminal of the related organization, the detection notifications of the detection target persons can be displayed in the descending order of the degree of reliability. Therefore, in the related organization notified of the detection notification related to the detection of the detection target person, a person in charge can search the detection target person in the descending order of the degree of reliability in the detection notification. Accordingly, human resources necessary to search the detection target person with respect to the detection notification, which is provided by mistakenly recognizing another person as the detection target person, are sufficiently suppressed even if a potential to detect the detection target person is improved using more imaging devices 2.

In s32, the control unit 11 may be configured not to notify the terminal of the related organization of the detection information in which the degree of reliability calculated through the reliability calculation processing is lower than a predetermined notification level. Therefore, the related organization can be prevented from being uselessly notified of the detection notification due to the false recognition of another person as the detection target person.

In the movement route estimation processing, the control unit 11 may enhance the degree of reliability with respect to the detection target person in whom the same movement route is repeatedly detected. For example, assuming that m is the number of repeatedly-detected times, and that $\gamma(\gamma \geq 1)$ is a proportional constant, the degree of detection reliability may be calculated by the following equation.

$$\text{degree of detection reliability} = m \times \gamma (\alpha \times Y + \beta \times Z)$$

The detection target person in whom the same movement route is repeatedly detected uses the detected movement route on a daily basis. Accordingly, the related organization can quickly and properly search the detection target person by enhancing the degree of detection reliability of the detection target person.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A monitoring device comprising:
    a detection target person storage part in which a feature of a face of each detection target person is stored;
    an image processor that processes images captured with a plurality of imaging devices having different imaging areas, and detects the image in which the detection target person stored in the detection target person storage part is captured;
    a detection information storage part in which detection information is stored, the detection information including the detection target person, imaging area, and imaging date and time with respect to the image in which the detection target person detected by the image processor is captured;
    a reliability calculator that calculates a degree of detection reliability in the image processor based on a time-space rationality, the time-space rationality being determined from a plurality of pieces of detection information on each detection target person, the pieces of detection information being stored in the detection information storage part; and
    an output part that outputs a detection notification about the detection target person based on the degree of detection reliability in the image processor, the degree of detection reliability being calculated by the reliability calculator.

2. The monitoring device according to claim 1,
    wherein the output part does not output the detection notification about the detection target person in whom the degree of detection reliability in the image processor, which is calculated by the reliability calculator, is less than a predetermined level.

3. The monitoring device according to claim 2, further comprising:
    a reliability ranking generator that generates a reliability ranking in which the detection target persons are ranked using the degree of detection reliability in the image processor, which is calculated by the reliability calculator,
    wherein the output part outputs the detection notification about each detection target person in a ranking format based on the reliability ranking generated by the reliability ranking generator.

4. The monitoring device according to claim 2,
    wherein the reliability calculator estimates a movement route of each detection target person from a change of the imaging area with time, which is obtained from the detection information on the detection target person, and the reliability calculator determines the time-space rationality with respect to the estimated movement route.

5. The monitoring device according to claim 1, further comprising:
    a reliability ranking generator that generates a reliability ranking in which the detection target persons are ranked using the degree of detection reliability in the image processor, which is calculated by the reliability calculator,
    wherein the output part outputs the detection notification about each detection target person in a ranking format based on the reliability ranking generated by the reliability ranking generator.

6. The monitoring device according to claim 5,
    wherein the reliability calculator estimates a movement route of each detection target person from a change of the imaging area with time, which is obtained from the detection information on the detection target person, and the reliability calculator determines the time-space rationality with respect to the estimated movement route.

7. The monitoring device according to claim 1,
    wherein the reliability calculator estimates a movement route of each detection target person from a change of the imaging area with time, which is obtained from the detection information on the detection target person, and the reliability calculator determines the time-space rationality with respect to the estimated movement route.

8. The monitoring device according to claim 7, wherein the reliability calculator calculates the degree of detection reliability in the image processor with respect to each detection target person such that the degree of detection reliability in the image processor increases with increasing number of times in which the identical movement route is estimated with respect to the detection target person.

9. A non-transitory computer-readable medium storing a reliability calculation program causing a computer to execute the steps of:

storing a feature of a face of each detection target person in a detection target person storage part;

processing images captured with a plurality of imaging devices having different imaging areas, and detecting the image in which the detection target person stored in the detection target person storage part is captured;

storing detection information in a detection information storage part, the detection information including the detection target person, imaging area, and imaging date and time with respect to the image in which the detection target person detected in the image processing step is captured;

calculating a degree of detection reliability in the image processing step based on a time-space rationality, the time-space rationality being determined from a plurality of pieces of detection information on each detection target person, the pieces of detection information being stored in the detection information storage part; and outputting a detection notification about the detection target person based on the degree of detection reliability in the image processing step, the degree of detection reliability being calculated in the reliability calculating step.

10. A reliability calculation method comprising the step of:

storing a feature of a face of each detection target person in a detection target person storage part;

processing images captured with a plurality of imaging devices having different imaging areas, and detecting the image in which the detection target person stored in the detection target person storage part is captured;

storing detection information in a detection information storage part, the detection information including the detection target person, imaging area, and imaging date and time with respect to the image in which the detection target person detected in the image processing step is captured;

calculating a degree of detection reliability in the image processing step based on a time-space rationality, the time-space rationality being determined from a plurality of pieces of detection information on each detection target person, the pieces of detection information being stored in the detection information storage part; and outputting a detection notification about the detection target person based on the degree of detection reliability in the image processing step, the degree of detection reliability being calculated in the reliability calculating step.

* * * * *